R. C. CASTIGLIONI.
BRACELET JOINT.
APPLICATION FILED MAR. 30, 1912.
1,036,189.
Patented Aug. 20, 1912.
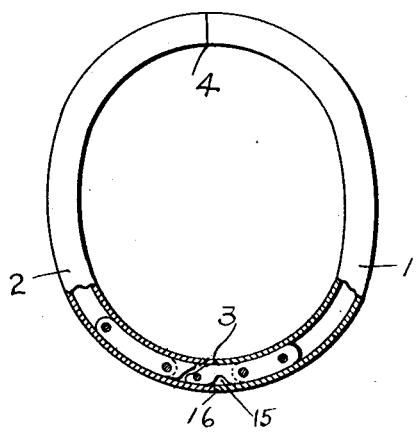
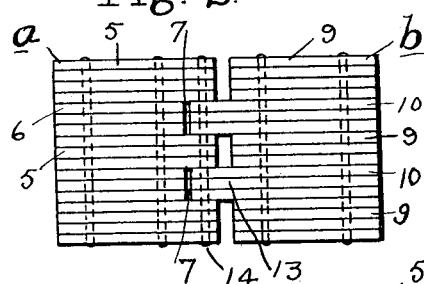
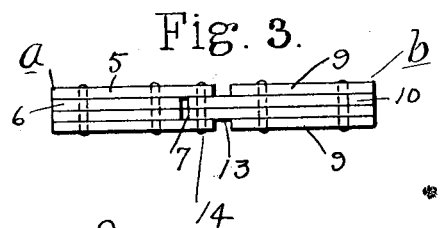
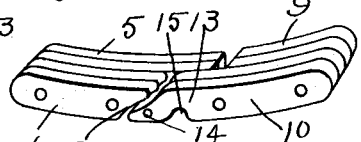
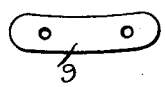
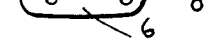
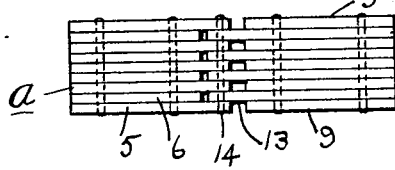
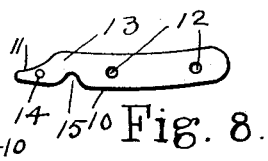
Witnesses
Chas. W. Eddy.
E. D. Ogden
Inventor
Rinaldo C. Castiglioni.
By Howard E. Barlow
Attorney
COLUMBIA PLANOGRAPH CO., WASHINGTON, D. C.

UNITED STATES PATENT OFFICE.

RINALDO C. CASTIGLIONI, OF PROVIDENCE, RHODE ISLAND, ASSIGNOR TO CASTIGLIONI COMPANY, OF PROVIDENCE, RHODE ISLAND, A CORPORATION OF RHODE ISLAND.

BRACELET-JOINT.

1,036,189.　　　　Specification of Letters Patent.　　Patented Aug. 20, 1912.

Application filed March 30, 1912. Serial No. 687,364.

*To all whom it may concern:*

Be it known that I, RINALDO C. CASTIGLIONI, a citizen of the United States, and resident of the city of Providence, in the county of Providence and State of Rhode Island, have invented certain new and useful Improvements in Bracelet-Joints, of which the following is a specification.

This invention relates to bracelet joints and has for its object to provide a joint for this purpose whose members are laminated or each constructed of a plurality of thin strips or plates laid side by side and pinned or otherwise fastened together whereby the width of the joint member is controlled by the number of strips employed.

With these and other objects in view, the invention consists of certain novel features of construction, as will be more fully described and particularly pointed out in the appended claims.

Of the accompanying drawings: Figure 1— illustrates a tubular bracelet, partly broken away, showing my improved joint mounted therein. Fig. 2— is an enlarged plan view illustrating a wide joint each of whose members is constructed of a plurality of thin plates. Fig. 3— is a plan view of a narrow joint constructed in the same manner. Fig. 4— is a perspective view illustrating a portion of one of the joints showing the interlocking feature and the stop for limiting the opening motion of the joint. Fig. 5— is a perspective view showing one of a series of plates used in one of the joint members. Fig. 6— is one of another series of plates used in the same joint member which provide the spacers and form the end walls of the recess therein. Fig. 7— is one of a series of plates used in the opposite joint member. Fig. 8— is one of another series of plates in the same member which extend into and is pivoted in the recess in the opposite member. Fig. 9— is a view illustrating the plates as alternating, first a long and then a short plate.

Referring to the drawing, 1 and 2 designate the two opposite portions of the tubular bracelet which portions are hinged together at 3 and are adapted to open at the point 4 to permit the bracelet to be passed onto the arm of the wearer.

In order to construct a very strong, durable, efficient and inexpensive joint for this purpose I provide a plurality of small thin plates from which each of the members of this joint is constructed, the width of the joint being controlled by the number of plates employed. The joint is constructed essentially of two distinct members $a$ and $b$ hinged together, and each member is constructed of two distinct sets of plates, member $a$ comprising a set of plates 5—5 arranged on each side of a set of shorter plates 6, said short plates forming the spacers to provide a recess 7 between the long plates 5, the ends of said short plates being beveled or undercut as at 8, see Figs. 4 and 6, forming a stop against which the ends of the opposite members abut as presently described. Member $b$ of this joint is provided with a set of plates 9 arranged on each side of a set of longer plates 10 which extend beyond said plates 9 into the recess 7 in the opposite member. The ends 13 of these elongated members are beveled at 11 to correspond with the bevel portion 8 in the ends of the opposite plates. These plates 9 and 10 are preferably riveted together as at 12 and the end of the extending portion 13 pivoted at 14 into the recess 7 of the opposite member, whereby a hinge joint is formed, whose opening motion is limited by the engagement of the plate ends 8 and 11. The outer edge of each extending plate 10 is scored or notched at 15 so that the edge 16 of the bracelet tube, into which the hinge is set, may extend therein when the bracelet is opened, the movement of the hinge in the opposite direction being limited by the closing of the bracelet.

A joint of any size and width may be constructed to fit any size of bracelet tubing, by simply connecting together the desired number of plates, that is, it may be made wider by adding on a few plates or narrower by removing one or more.

In constructing this joint the little plates may be made by the thousand, being stamped and punched and completely formed in a single operation ready to be assembled, which stamping and assembling may be done by unskilled hands, providing a joint of any desired width, of the maximum strength, and of the minimum cost to produce.

I claim:

1. A joint for bracelets comprising two members each constructed of a plurality of both long and short plates laid side by side and pinned together, one member having one or more recesses formed by the short plates and the other member having projections formed by the long plates which extend and are pivoted in said recesses, leaving a space between the ends of said projections and the end walls of the recess and means in said plates for limiting the opening movement of the joint the width of the joint being controlled by the number of plates employed.

2. A joint for bracelets comprising two members each constructed of a plurality of plates laid side by side and pinned together, one member having a recess formed by short plates and the other member having projections formed by long plates which extend and are pivoted in said recess, leaving a space between the ends of said projections and the end walls of the recess the ends of the long and short plates being oppositely beveled to engage each other when the joint is swung back to limit the opening movement, and the width of the joint being controlled by the number of plates employed.

3. A joint for bracelets comprising two members each constructed of a plurality of series of plates laid side by side and pinned together, one member having a recess formed by a series of short plates and the other member having a projecting series extending and pivoted in said recess, leaving a space between the ends of said projections and the end walls of the recess the ends of the long and short plates being oppositely beveled to engage each other when the joint is swung back to limit the opening movement and the width of the joint being controlled by the number of plates employed, said joint members being adapted to fit and be secured within the tubing of the bracelet and the outer edges of said extending plates being scored to receive the edge of the tubing when the bracelet is opened.

In testimony whereof I affix my signature in presence of two witnesses.

RINALDO C. CASTIGLIONI.

Witnesses:
 HOWARD E. BARLOW,
 E. I. OGDEN.

Copies of this patent may be obtained for five cents each, by addressing the "Commissioner of Patents, Washington, D. C."